United States Patent
Masi

(10) Patent No.: US 10,219,633 B1
(45) Date of Patent: Mar. 5, 2019

(54) PERSONAL FLOTATION DEVICE

(71) Applicant: Douglas Masi, Maspeth, NY (US)

(72) Inventor: Douglas Masi, Maspeth, NY (US)

(73) Assignee: D and M Asset Management, LLC, Goodyear, AZ (US)

( * ) Notice: Subject to any disclaimer, the term of this patent is extended or adjusted under 35 U.S.C. 154(b) by 15 days.

(21) Appl. No.: 15/728,866

(22) Filed: Oct. 10, 2017

Related U.S. Application Data

(60) Provisional application No. 62/409,527, filed on Oct. 18, 2016.

(51) Int. Cl.
| | | |
|---|---|---|
| *A47C 15/00* | (2006.01) | |
| *A01K 29/00* | (2006.01) | |
| *B63B 35/58* | (2006.01) | |
| *B65D 81/38* | (2006.01) | |
| *B65D 85/00* | (2006.01) | |

(52) U.S. Cl.
CPC ............ *A47C 15/006* (2013.01); *A01K 29/00* (2013.01); *B63B 35/58* (2013.01); *B65D 81/38* (2013.01); *B65D 85/70* (2013.01)

(58) Field of Classification Search
CPC ...... A47C 15/006; A01K 29/00; B63B 35/58; B65D 81/38; B65D 85/70
See application file for complete search history.

(56) References Cited

U.S. PATENT DOCUMENTS

| | | | | |
|---|---|---|---|---|
| 3,067,441 A | * | 12/1962 | Dysard | B63B 35/78 441/132 |
| 3,117,327 A | * | 1/1964 | Mathew | A47C 15/006 297/188.14 |
| 4,115,888 A | * | 9/1978 | Sievers | A47C 15/006 440/38 |
| D350,326 S | * | 9/1994 | Griffin | D12/316 |
| 5,403,220 A | * | 4/1995 | Goad, Sr. | A47C 15/006 440/38 |
| 5,520,561 A | * | 5/1996 | Langenohl | B63B 35/78 441/129 |
| 5,628,658 A | * | 5/1997 | Clifford | A47C 15/006 441/130 |
| 6,224,444 B1 | * | 5/2001 | Klimenko | A47C 4/54 297/452.41 |

(Continued)

FOREIGN PATENT DOCUMENTS

WO 2007134312 A2 11/2007

*Primary Examiner* — S. Joseph Morano
*Assistant Examiner* — Jovon E Hayes
(74) *Attorney, Agent, or Firm* — Invention To Patent Services; Alex Hobson

(57) ABSTRACT

The personal flotation device is adapted for use with a person and a pet. The personal floatation device is configured for use with water. The personal flotation device provides buoyancy during water based activities. The personal flotation device is a multipurpose device that: 1) forms a seat; 2) forms a raft; and, 3) forms a plurality of flotation devices. The plurality of flotation devices are suitable for use by the person and the pet. The personal flotation device comprises a pet pad, a float, an insulated storage case, a dry storage container, and a plurality of straps. The plurality of flotation devices comprises the pet pad and the float. The plurality of straps interconnect the pet pad, the float, the insulated storage case, and the dry storage container to form the seat and the raft portions of the personal flotation device.

19 Claims, 7 Drawing Sheets

(56) References Cited

U.S. PATENT DOCUMENTS

| | | | | |
|---|---|---|---|---|
| 6,227,925 B1* | 5/2001 | Boddy | ................... | B63B 35/78 |
| | | | | 441/129 |
| 6,276,979 B1* | 8/2001 | Saltel | ................... | A47C 15/006 |
| | | | | 441/132 |
| 6,746,293 B1* | 6/2004 | Kirby, Jr. | .............. | A47C 15/006 |
| | | | | 4/492 |
| D549,297 S * | 8/2007 | Eagan | ......................... | D21/803 |
| 7,571,965 B1* | 8/2009 | Perry | ................... | A47C 15/006 |
| | | | | 297/440.16 |
| 7,587,986 B2* | 9/2009 | Neidert | ................... | B63B 7/04 |
| | | | | 114/352 |
| 8,752,492 B1 | 6/2014 | Harris | | |
| 9,598,153 B2* | 3/2017 | Connolly | ................. | B63B 35/73 |
| 2010/0032995 A1* | 2/2010 | Tarter | ................. | A47G 23/0216 |
| | | | | 297/188.01 |

* cited by examiner

PERSONAL FLOTATION DEVICE

CROSS REFERENCES TO RELATED APPLICATIONS

This non-provisional application claims priority under 35 USC 119(e) to U.S. provisional application U.S. 62/409,527 filed on Oct. 18, 2016, by the inventor, Douglas John Masi of Goodyear Ariz.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transporting and ships including equipment for life-saving in water, more specifically, an adaptation of vessel parts of furnishing for lifesaving purposes for use with people and animals.

SUMMARY OF INVENTION

The personal flotation device is adapted for use with a person. The personal flotation device is adapted for use with a pet. The personal floatation device is configured for use with water. The personal flotation device is a device that provides buoyancy during water based activities. The personal flotation device is a multipurpose device that: 1) forms a seat for use in a small water craft; 2) forms a raft for use in the water; and, 3) forms a plurality of flotation devices. The plurality of flotation devices are suitable for use by the person and the pet. The personal flotation device comprises a pet pad, a float, an insulated storage case, a dry storage container, and a plurality of straps. The plurality of flotation devices comprises the pet pad and the float. The plurality of straps interconnect the pet pad, the float, the insulated storage case, and the dry storage container to form the seat and the raft portions of the personal flotation device.

These together with additional objects, features and advantages of the personal flotation device will be readily apparent to those of ordinary skill in the art upon reading the following detailed description of the presently preferred, but nonetheless illustrative, embodiments when taken in conjunction with the accompanying drawings.

In this respect, before explaining the current embodiments of the personal flotation device in detail, it is to be understood that the personal flotation device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the personal flotation device.

It is therefore important that the claims be regarded as including such equivalent construction insofar as they do not depart from the spirit and scope of the personal flotation device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
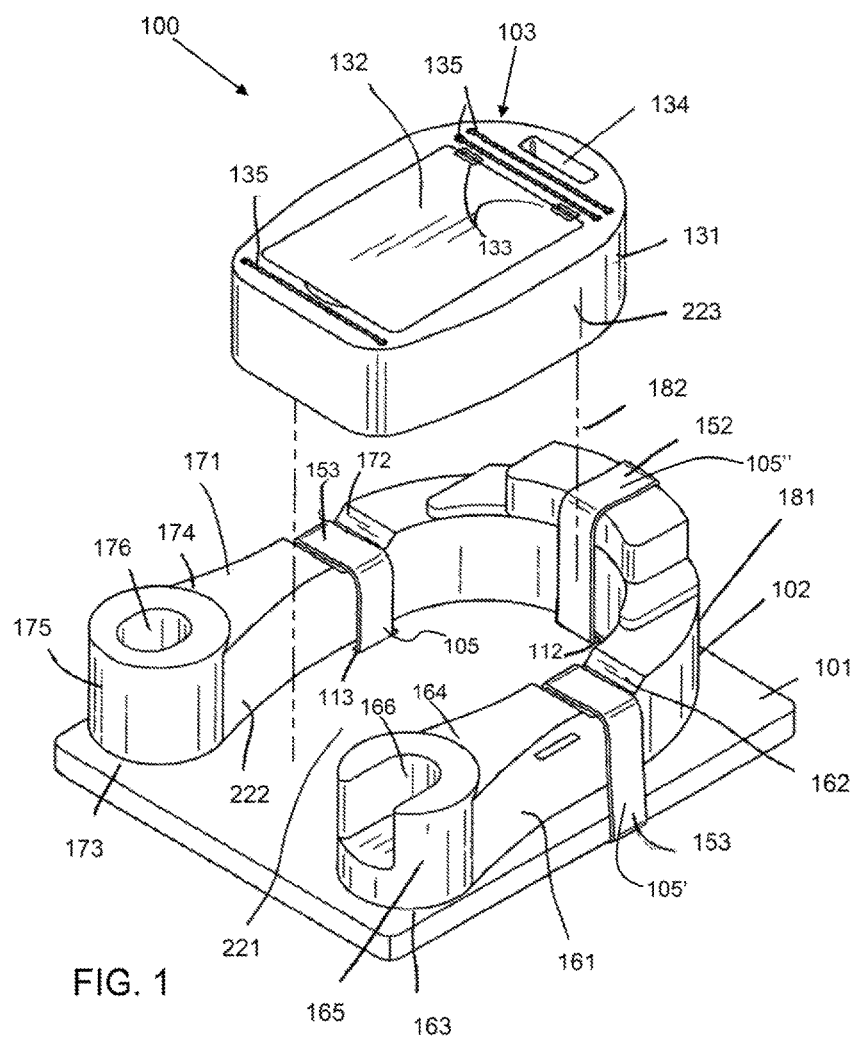
FIG. 1 is a perspective view of an embodiment of the disclosure.
Figure 2:
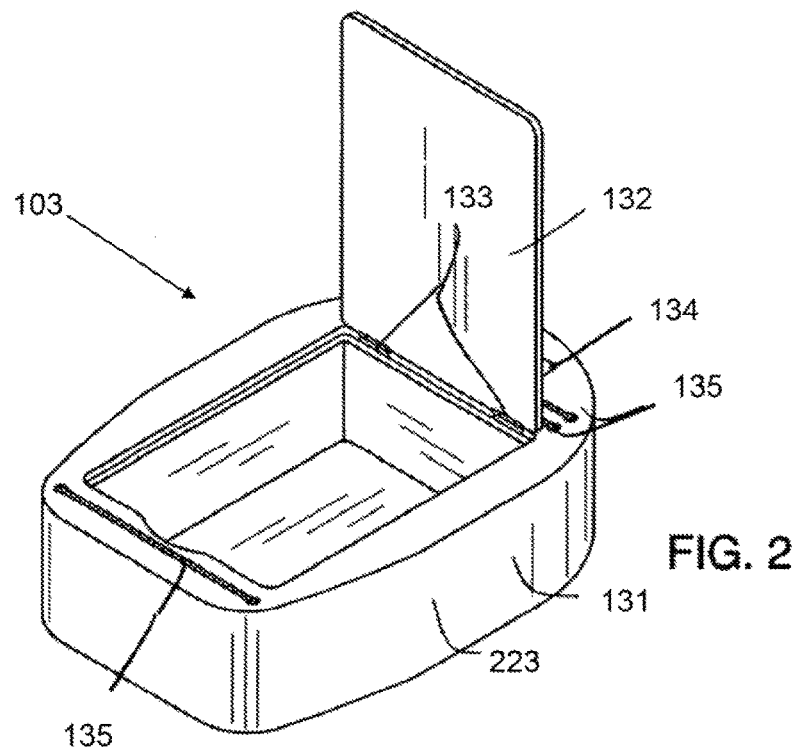
FIG. 2 is a detail perspective view of an embodiment of the disclosure.
Figure 3:
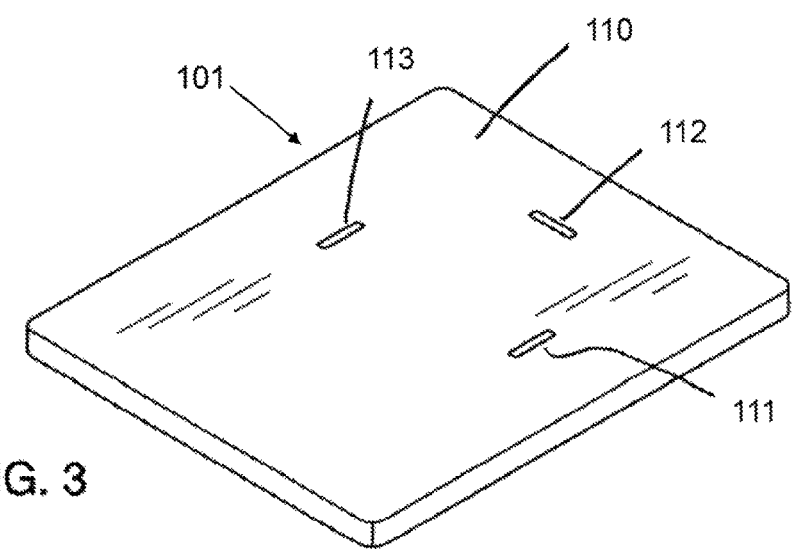
FIG. 3 is a detail perspective view of an embodiment of the disclosure.
Figure 4:
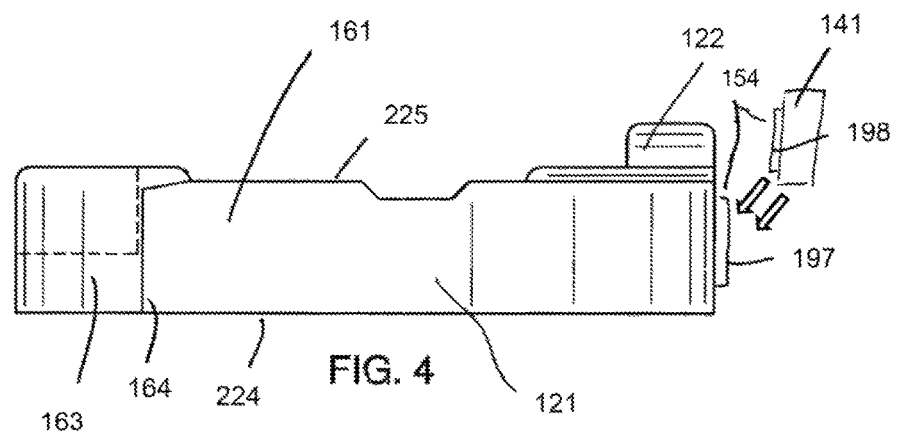
FIG. 4 is a detail side view of an embodiment of the disclosure.
Figure 5:
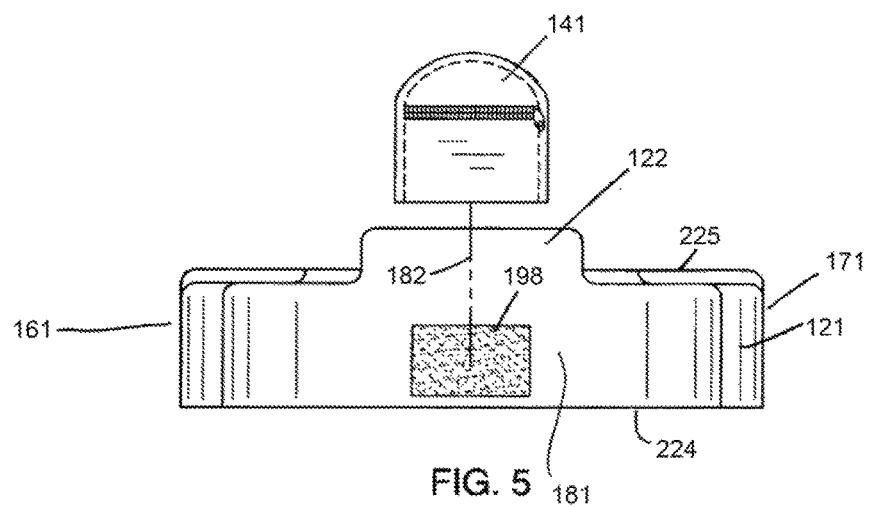
FIG. 5 is a detail side view of an embodiment of the disclosure.
Figure 6:
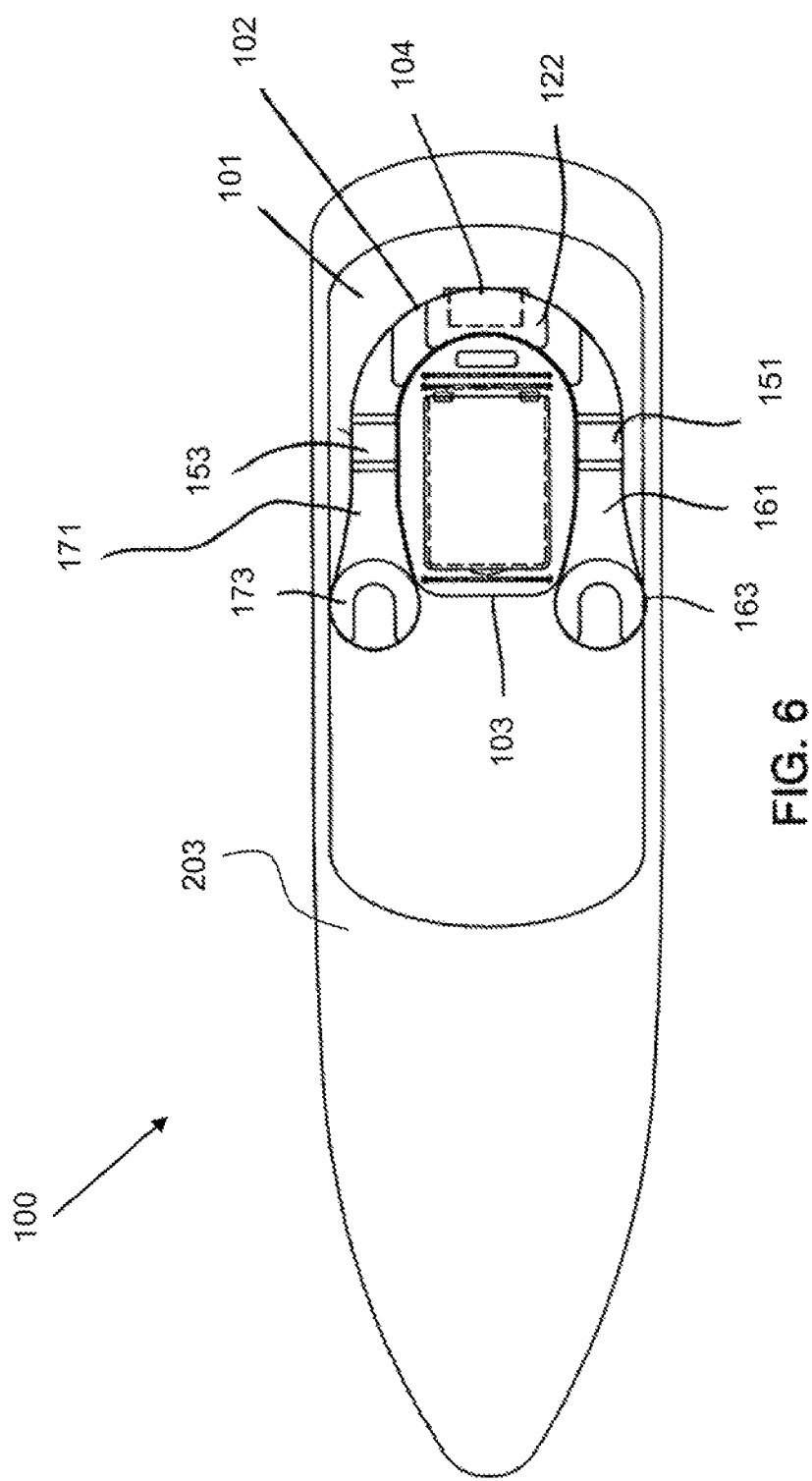
FIG. 6 is an in use view of an embodiment of the disclosure.
Figure 7:
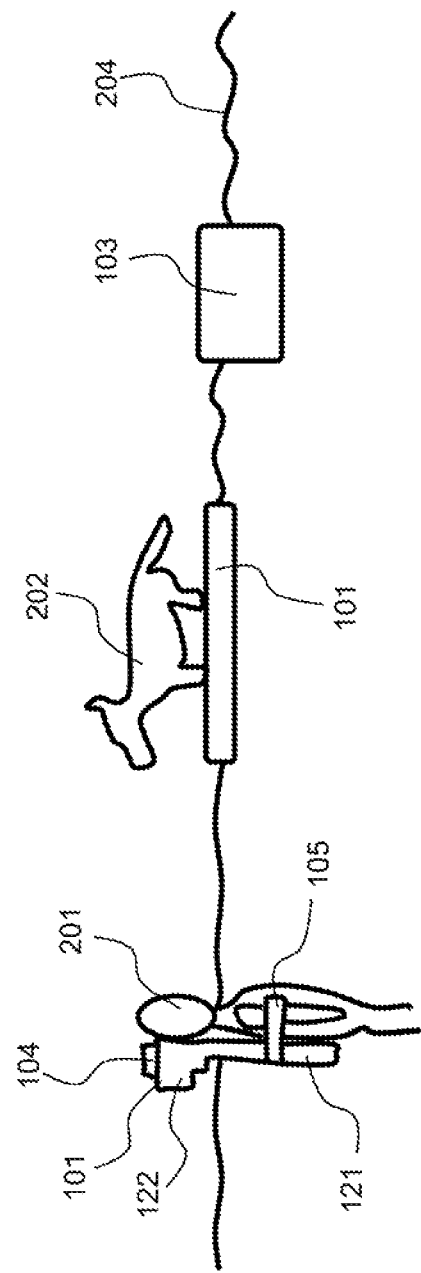
FIG. 7 is an in use view of an embodiment of the disclosure.
Figure 8:
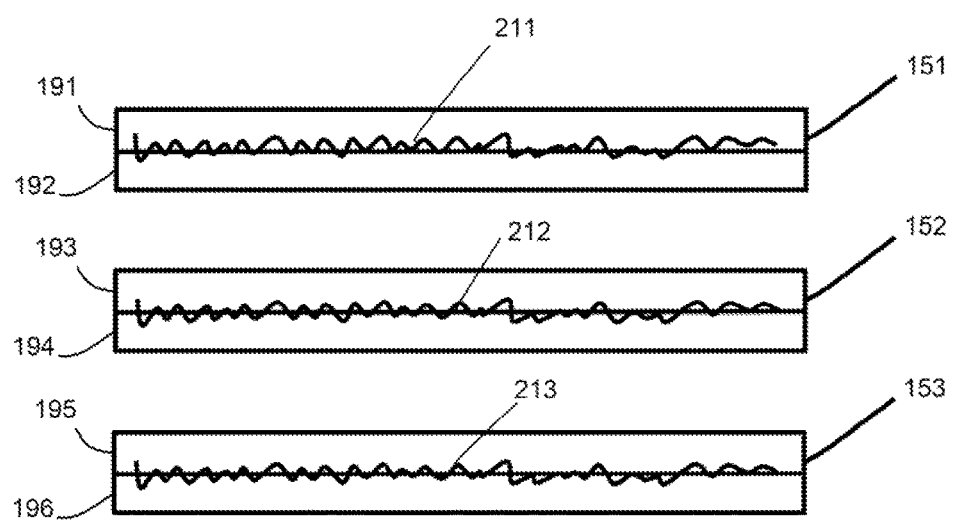
FIG. 8 is a detail view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 9.

The personal flotation device 100 (hereinafter invention) is adapted for use with a person 201. The invention 100 is adapted for use with a pet 202. The invention 100 is configured for use with water 204. The invention 100 is a device that provides buoyancy during water 204 based activities. The invention 100 is a multipurpose device that: 1) forms a seat for use in a small water 204 craft 203; 2) forms a raft for use in the water 204; and, 3) forms a plurality of flotation devices. The plurality of flotation devices are suitable for use by the person 201 and the pet 202. The invention 100 comprises a pet pad 101, a float 102, an insulated storage case 103, a dry storage case 104, and a plurality of straps 105. The plurality of straps 105 interconnect the pet pad 101, the float 102, the insulated storage case 103, and the dry storage case 104 to form the seat and the raft portions of the invention 100. The plurality of flotation devices comprises the pet pad 101 and the float 102. The person 201 uses the float 102 as a PFD in an emergency situation. The pet 202 uses the pet pad 101 as a PFD in an emergency situation.

The person 201 refers to an individual who is using the invention 100 as intended. The pet 202 refers to a domesticated animal that is accompanying the person 201 in the small water 204 craft 203 and the water 204. The small water 204 craft 203 refers to a small vehicle adapted for use in travel over water 204. The water 204 refers to the body of water 204 on which the invention 100 is being used. The beverage 205 refers to a can, cup or bottle of a consumable liquid.

The pet pad 101 is a rectangular plate molded from closed cell ethylene-vinyl acetate (hereinafter EVA) foam. The EVA foam used in the pet pad 101 provides the buoyancy of the pet pad 101. When the invention 100 is used as a raft, as shown most clearly in FIG. 9, the pet pad 101 forms a buoyant horizontal surface that forms a seat that keeps the person 201 afloat in the water 204. When the invention 100 is used as a PFD as shown most clearly in FIG. 7, the pet pad 101 forms a buoyant horizontal surface that keeps the pet 202 afloat in the water 204. When the invention 100 is used as a seat as shown most clearly in FIGS. 1 and 6, the pet pad 101 forms a pedestal that supports the float 102 and the insulated storage case 103 on the small water 204 craft 203.

The pet pad 101 comprises a buoyant plate 110. The buoyant plate 110 further comprises a first slot 111, a second slot 112, and a third slot 113.

The buoyant plate 110 is a rectangular plate formed from EVA foam. The buoyant plate 110 provides the buoyancy of the pet pad 101. The first slot 111 is an aperture formed through the buoyant plate 110. The first slot 111 is sized such that a strap selected from the plurality of straps 105 can be inserted through the first slot 111. The second slot 112 is an aperture formed through the buoyant plate 110. The second slot 112 is sized such that a strap selected from the plurality of straps 105 can be inserted through the second slot 112. The third slot 113 is an aperture formed through the buoyant plate 110. The third slot 113 is sized such that a strap selected from the plurality of straps 105 can be inserted through the third slot 113.

The float 102 and the insulated storage case 103 are mounted on the pet pad 101 when the invention 100 is used as the seat. The float 102 is a horseshoe shaped structure formed from EVA foam. The EVA foam used in the float 102 provides the buoyancy of the float 102.

Figure 9:
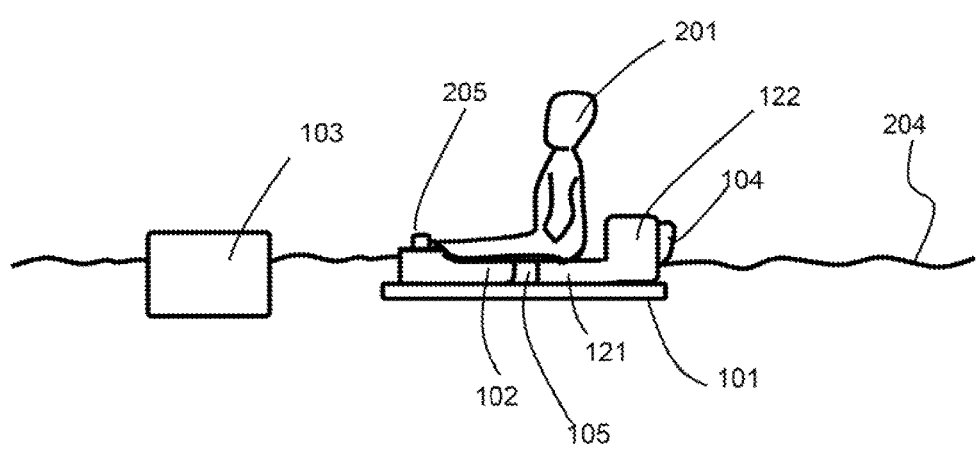
FIG. 9 is an in use view of an embodiment of the disclosure.

When the invention 100 is used as a raft, as shown most clearly in FIG. 9, the float 102 forms a buoyant structure 121 that further keeps the person 201 afloat in the water 204. In this scenario, the float 102 further forms a left armrest 161 and a right armrest 171 for use by the person 201. When the invention 100 is used as a PFD as shown most clearly in FIG. 7, the float 102 forms a buoyant structure 121 that is worn by the person 201 and that keeps the person 201 afloat in the water 204. When the invention 100 is used as a seat as shown most clearly in FIGS. 1 and 6, the float 102 forms a backrest, a left armrest 161, and a right armrest 171 for use by the person 201.

The float 102 comprises a buoyant structure 121 and a bias mass 122. The buoyant structure 121 is further defined with a flush surface 224, a structured surface 225, a negative space 221, and an inner perimeter 222. The negative space 221 refers to the area partially bounded by the inner perimeter 222 of the float 102. The inner perimeter 222 refers to the concave surfaces of the float 102 formed by the left armrest 161, the right armrest 171, and the right armrest 171. The flush surface 224 is the surface of the float 102 that is proximal to the pet pad 101 when the invention 100 is used as a raft and a seat. The flush surface 224 forms a planar surface such that the flush surface 224 sits flush against the pet pad 101. The structured surface 225 is the surface of the float 102 that is distal from the flush surface 224.

The buoyant structure 121 is a horseshoe shaped structure formed from EVA foam. The buoyant structure 121 forms the characteristic horseshoe shape of the float 102. The buoyant structure 121 comprises a left armrest 161, a right armrest 171, and a closed end 181. The left armrest 161 is further defined with a left arm free end 164. The right armrest 171 is further defined with a right arm free end 174. The closed end 181 is further defined with a closed end midpoint 182.

The left armrest 161 comprises a left arm groove 162 and a left arm cup holder 163. The left arm cup holder 163 further comprises a left arm bulb 165 and a left arm cup cylinder 166. The right armrest 171 comprises a right arm groove 172 and a right arm cup holder 173. The right arm cup holder 173 further comprises a right arm bulb 175 and a right arm cup cylinder 176.

The left armrest 161 is the arm of the horseshoe shape of the float 102 that is proximal to the left side of the person 201. The left arm groove 162 is a groove formed in the structured surface 225 of the left armrest 161. The left arm groove 162 receives the first hook and loop fastener 151 such that the first hook and loop fastener 151 will not shift during use. The left arm cup holder 163 is a structure that is formed at the left arm free end 164. The left arm cup holder 163 provides a location to store a beverage 205 during water 204 based activities. The left arm free end 164 is the end of the left armrest 161 that is distal from the closed end 181.

The left arm bulb 165 is a roughly cylindrical structure that attaches to the left arm free end 164 of the left armrest 161. The left arm cup cylinder 166 is a negative space that is formed as a cylinder. The left arm cup cylinder 166 is coaxially located within the left arm bulb 165. The opening to the left arm cup cylinder 166 is formed in the structured surface 225 of the left armrest 161. The left arm cup cylinder 166 is sized to receive the beverage 205.

The right armrest 171 is the arm of the horseshoe shape of the float 102 that is proximal to the right side of the person 201. The right arm groove 172 is a groove formed in the structured surface 225 of the right armrest 171. The right arm groove 172 receives the third hook and loop fastener 153 such that the third hook and loop fastener 153 will not shift during use. The right arm cup holder 173 is a structure that is formed at the right arm free end 174. The right arm cup holder 173 provides a location to store a beverage 205 during water 204 based activities. The right arm free end 174 is the end of the right armrest 171 that is distal from the closed end 181.

The right arm bulb 175 is a roughly cylindrical structure that attaches to the right arm free end 174 of the right armrest 171. The right arm cup cylinder 176 is a negative space that is formed as a cylinder. The right arm cup cylinder 176 is coaxially located within the right arm bulb 175. The opening to the right arm cup cylinder 176 is formed in the structured surface 225 of the right armrest 171. The right arm cup cylinder 176 is sized to receive the beverage 205.

The bias mass 122 is an additional structure formed from EVA foam. The bias mass 122 attaches to the structured surface 225 of the buoyant structure 121 at the closed end midpoint 182 of the closed end 181. The bias mass 122 creates an asymmetry in the buoyancy of the float 102. When the invention 100 is worn as a PFD the asymmetry formed by the bias mass 122 ensures that the head of the person 201 remains above the water 204.

The insulated storage case 103 is an insulating structure suitable for storing foodstuffs and beverages 205. The insulated storage case 103 is a hollow structure formed in a roughly rounded rectilinear block shape. The insulated storage case 103 is formed from EVA foam. The EVA foam used in the insulated storage case 103 provides the insulated storage case 103 with enough buoyancy that the insulated storage case 103 can keep itself and the contents contained within the insulated storage case 103 afloat. The form factor of the insulated storage case 103 is congruent to the form factor of the hollow interior of the float 102 such that the insulated storage case 103 will fit flush within the hollow center of the float 102. In this configuration the insulated storage case 103 and the float 102 will effectively form a single structure.

When the invention 100 is used as a raft, as shown most clearly in FIG. 9, the insulated storage case 103 floats beside the person 201 in the water 204. When the invention 100 is used as a PFD as shown most clearly in FIG. 7, the insulated storage case 103 floats beside the person 201 in the water 204. When the invention 100 is used as a seat as shown most clearly in FIGS. 1 and 6, the insulated storage case 103 forms the bench upon which the person 201 sits while in the small water 204 craft 203.

The insulated storage case 103 comprises a container 131, a lid 132, a hinge 133, a handle slot 134, and a plurality of bungee cords 135. The container 131 is further defined with an outer perimeter 223. The outer perimeter 223 refers to the exterior surfaces of the container 131 of the insulated storage case 103 that are congruent to the inner perimeter 222 of the float 102.

The container 131 is a hollow insulating structure formed from EVA foam. The form factor of the container 131 is congruent to the form factor of the hollow interior of the buoyant structure 121. The container 131 receives the foodstuffs, the beverages 205, and other contents stored in the container 131 through the open face. The EVA foam used in the container 131 ensures that the insulated storage case 103 and the contents of the insulated storage case 103 remain afloat while in the water 204.

The lid 132 is a cover that is attached to the container 131 such that the lid 132 rotates relative to the open face of the container 131. The lid 132 is a barrier that covers the open face of the container 131. The lid 132 controls access into the hollow interior of the container 131.

The hinge 133 refers to commercially available hardware that attaches the lid 132 to the container 131 such that the lid 132 rotates in a manner that opens and closes the open face of the container 131. The handle slot 134 is an aperture that forms a channel in a wall of the container 131. The handle slot 134: 1) forms a grip used by the person 201; and 2) forms an anchor point that allows the second hook and loop fastener 152 to attach the insulated storage case 103 to the float 102. Each of the plurality of bungee cords 135 attaches to the exterior surface of the container 131. Each of the plurality of bungee cords 135 is an elastic cord used to attach objects to the exterior surface of the container 131.

The dry storage case 104 is a water 204 tight containment structure. The dry storage case 104 contains items that the person 201 wants to keep dry while on the water 204. When the invention 100 is used as a raft, as shown most clearly in FIG. 9, the dry storage case 104 attaches to the float 102. When the invention 100 is used as a PFD as shown most clearly in FIG. 7, the dry storage case 104 attaches to the float 102. When the invention 100 is used as a seat as shown most clearly in FIGS. 1 and 6, the dry storage case 104 attaches to the float 102.

The dry storage case 104 comprises a dry bag 141 and a fourth hook and loop fastener 154. The fourth hook and loop fastener 154 further comprises a seventh hook/loop surface 197 and an eighth hook/loop surface 198. The dry bag 141 is a commercially available bag that is designed to contain objects in a water 204 impermeable environment. The dry bag 141 attaches to the float 102 using the fourth hook and loop fastener 154. The seventh hook/loop surface 197 of the fourth hook and loop fastener 154 attaches to the back of the closed end 181 of the float 102 at the closed end midpoint 182. The eighth hook/loop surface 198 attaches to the dry bag 141. The dry bag 141 attaches to the float 102 by pressing the seventh hook/loop surface 197 to the eighth hook/loop surface 198 to form the fourth hook and loop fastener 154.

Each of the plurality of straps 105 is a commercially available fastening device. When the invention 100 is used as a raft, as shown most clearly in FIG. 9, the plurality of straps 105 binds the float 102 to the pet pad 101. When the invention 100 is used as a PFD as shown most clearly in FIG. 7, the plurality of straps 105 binds the float 102 to the person 201. When the invention 100 is used as a seat as shown most clearly in FIGS. 1 and 6, the plurality of straps 105 binds the float 102 and the insulated storage case 103 to the pet pad 101.

The plurality of straps 105 comprises a first hook and loop fastener 151, a second hook and loop fastener 152, and a third hook and loop fastener 153. The first hook and loop fastener 151 further comprises a first hook/loop surface 191, a second hook/loop surface 192, and a first seam 211. The second hook and loop fastener 152 further comprises a third hook/loop surface 193, a fourth hook/loop surface 194, and a second seam 212. The third hook and loop fastener 153 further comprises a fifth hook/loop surface 195, a sixth hook/loop surface 196, and a third seam 213.

The first hook and loop fastener 151 is a strap configured as a hook and loop fastener. The first hook and loop fastener 151 is formed by attaching the first hook/loop surface 191 to the second hook/loop surface 192 using the first seam 211. The first hook/loop surface 191 and the second hook/loop surface 192 are joined back to back such that the first hook and loop fastener 151 will form a loop when the first hook/loop surface 191 is pressed against the second hook/loop surface 192.

The second hook and loop fastener 152 is a strap configured as a hook and loop fastener. The second hook and loop fastener 152 is formed by attaching the third hook/loop surface 193 to the fourth hook/loop surface 194 using the second seam 212. The third hook/loop surface 193 and the fourth hook/loop surface 194 are joined back to back such that the second hook and loop fastener 152 will form a loop when the third hook/loop surface 193 is pressed against the fourth hook/loop surface 194.

The third hook and loop fastener 153 is a strap configured as a hook and loop fastener. The third hook and loop fastener 153 is formed by attaching the fifth hook/loop surface 195 to the sixth hook/loop surface 196 using the third seam 213. The fifth hook/loop surface 195 and the sixth hook/loop surface 196 are joined back to back such that the third hook and loop fastener 153 will form a loop when the fifth hook/loop surface 195 is pressed against the sixth hook/loop surface 196.

The first seam 211 is a sewn seam. The second seam 212 is a sewn seam. The third seam 213 is a sewn seam. Sewn seams are discussed in greater detail elsewhere in this disclosure.

The first hook and loop fastener 151 attaches the left armrest 161 of the float 102 to the pet pad 101 during use of the invention 100 as a raft or a seat. The first hook and loop fastener 151 is placed over the left arm groove 162 of the left armrest 161, threaded through the first slot 111 and looped around the edge of the buoyant plate 110. The first hook and loop fastener 151 is secured by pressing the first hook/loop surface 191 against the second hook/loop surface 192. The first hook and loop fastener 151 binds the left armrest 161 to the left arm of the person 201 when the invention 100 is used as a PFD. The first hook and loop fastener 151 is secured by pressing the first hook/loop surface 191 against the second hook/loop surface 192.

The third hook and loop fastener 153 attaches the right armrest 171 of the float 102 to the pet pad 101 during use of the invention 100 as a raft or a seat. The third hook and loop fastener 153 is placed over the right arm groove 172 of the right armrest 171, threaded through the third slot 113 and looped around the edge of the buoyant plate 110. The third hook and loop fastener 153 is secured by pressing the fifth hook/loop surface 195 against the sixth hook/loop surface 196. The third hook and loop fastener 153 binds the right armrest 171 to the right arm of the person 201 when the invention 100 is used as a PFD. The third hook and loop fastener 153 is secured by pressing the fifth hook/loop surface 195 against the sixth hook/loop surface 196.

The second hook and loop fastener 152 attaches the closed end 181 of the float 102 to the pet pad 101 during use of the invention 100 as a raft or a seat. The second hook and loop fastener 152 further attaches the container 131 of the insulated storage case 103 to the pet pad 101 during use of the invention 100 as a raft or a seat. The second hook and loop fastener 152 is placed over the closed end 181 of the float 102. The second hook and loop fastener 152 is threaded through the handle slot 134 of the insulated storage case 103. The second hook and loop fastener 152 is threaded through the second slot 112 and looped around the edge of the buoyant plate 110. The second hook and loop fastener 152 is secured by pressing the third hook/loop surface 193 against the fourth hook/loop surface 194.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Bind: As used in this disclosure, to bind is a verb that means to tie or secure a first object to a second object by wrapping a third object around the first object and the second object.

Bungee: As used in this disclosure, the term bungee refers to an elastic cord or a mesh of elastic cords.

Channel: As used in this disclosure, a channel is a tubular passage through which an object or fluid is passed through.

Coaxial: As used in this disclosure, coaxial is a term that refers to a first object that is inserted or contained within a second object such: 1) that the first object and the second object share the same center point if the or first object and the second object are treated as a two dimensional objects; or, 2) that the first object and the second object share the same center axis if the first object and the second object are treated as a cylinder.

Congruent: As used in this disclosure, congruent is a term that compares a first object to a second object. Specifically, two objects are said to be congruent when: 1) they are geometrically similar; and, 2) the first object can be superimposed over the second object such that the first object aligns, within manufacturing tolerances, with second object.

Copolymer: As used in this disclosure, a copolymer is a polymer formed from two or more repeating molecules (also referred to as monomers).

Cord: As used in this disclosure, a cord is a long, thin, and flexible piece of string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Correspond: As used in this disclosure, the term correspond means that a first object is in some manner linked to a second object in a one to one relationship.

Cylinder: As used in this disclosure, a cylinder is a geometric structure defined by two identical flat and parallel ends, also commonly referred to as bases, which are circular in shape and connected with a single curved surface, referred to in this disclosure as the face. The cross section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Elastic: As used in this disclosure, an elastic is a material or object that deforms when a force is applied to it and that is able to return to its relaxed shape after the force is removed. A material that exhibits these qualities is also referred to as an elastomeric material.

Elastic Cord: As used in this disclosure, an elastic cord is a cord that contains elastic yarns as some of the yarns that make up the cord. An elastic cord is constructed such that the elastic cord will stretch when a force is applied and will return to its original shape when after the force is removed. Shock cord and bungee cord are synonyms for an elastic cord.

Ethylene-Vinyl Acetate: As used in this disclosure, ethylene-vinyl acetate (CAS 24938-78-8—also referred to as polyethylene-vinyl acetate) is a copolymer formed from ethylene and vinyl acetate molecules.

Fastener: As used in this disclosure, a fastener is a device that is used to join or affix two objects. Fasteners generally comprise a first element which is attached to the first object and a second element which is attached to the second object such that the first element and the second element join to affix the first object and the second object. Common fasteners include, but are not limited to, hooks, zippers, snaps, buttons, buckles, quick release buckles, or hook and loop fasteners.

Flush: As used in this disclosure, the term flush is used to describe the alignment of a first surface and a second surface on a single plane.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal.

Grip: As used in this disclosure, a grip is an accommodation formed on or within an object that allows the object to be grasped or manipulated by a hand.

Hinge: As used in this disclosure, a hinge is a device that permits the turning, rotating, or pivoting of a first object relative to a second object.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook and loop fastener or the loop surface of a hook and loop fastener is attached to an object this will simply be referred to as the "hook/loop surface" with the understanding that when the two objects are fastened together one of the two objects will have a hook surface and the remaining object will have the loop surface.

Horseshoe: As used in this disclosure, a horseshoe refers to an object that has the shape of a horseshoe. The horseshoe refers to a metal structure that is used to protect the hoof of a horse. Specifically, the metal structure is a metal band is attached around the perimeter of the bottom of the hoof of the horse. The horseshoe has an appearance of open U shaped ring.

Insulating Structure: As used in this disclosure, an insulating structure is a structure that inhibits, and ideally prevents, the transfer of heat through the insulating structure. Insulating structures may also be used to inhibit or prevent the transfer of sound through the insulating structure. Methods to form insulating structures include, but are not limited to: 1) the use of materials with low thermal conductivity; and, 2) the use of a structural design that places a vacuum within the insulating structure within the anticipated transfer path of the heat or sound.

Lid: As used in this disclosure, a lid is a removable cover that is placed over an opening of a hollow structure to enclose the hollow structure.

Loop: As used in this disclosure, a loop is a length of a first linear structure including, but not limited to, shafts, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

PFD: As used in this disclosure, PFD is an acronym for a personal flotation device. A personal flotation device is safety equipment in the form of a garment or device that assists a person in remaining afloat in water.

Perimeter: As used in this disclosure, a perimeter is one or more curved or straight lines that bounds an enclosed area on a plane or surface. The perimeter of a circle is commonly referred to as a circumference.

Pivot: As used in this disclosure, a pivot is a rod or shaft around which an object rotates or swings.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk like appearance.

Rectilinear Block: As used in this disclosure, a rectilinear block refers to a three-dimensional structure comprising a plurality of rectangular surfaces. Rectilinear blocks are similar to rectangular blocks and are often used to create a structure with a reduced interior volume relative to a rectangular block. Within this disclosure, a rectilinear block may further comprise rounded edges and corners.

Rounded: A used in this disclosure, the term rounded refers to the replacement of an apex, vertex, or edge or brink of a structure with a (generally smooth) curvature wherein the concave portion of the curvature faces the interior or center of the structure.

Seam: As used in this disclosure, a seam is a joining of: 1) a first textile to a second textile; 2) a first sheeting to a second sheeting; or, 3) a first textile to a first sheeting. Potential methods to form seams include, but are not limited to, a sewn seam, a heat bonded seam, an ultrasonically bonded seam, or a seam formed using an adhesive.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Slot: As used in this disclosure, a slot is a long narrow groove or aperture that is formed in an object.

Strap: As used in this disclosure a strap is a strip of leather, cloth, or other flexible material, often with a buckle, that is used to fasten, secure, carry, or hold onto something.

Strip: As used in this disclosure, the term describes a long and narrow object of uniform thickness that appears thin relative to the length of the object. Strips are often rectangular in shape.

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A personal flotation system comprising:
   a) a personal float device comprising a buoyant structure wherein the buoyant structure comprises:
      i) a closed end;
      ii) a right armrest extending from a first side of the closed end to a right armrest free end;
      iii) a cylindrical shaped right arm bulb configured on the right armrest free end of the right armrest;
      iv) a left armrest extending from a second side of the closed end to a left arm free end;
      v) a cylindrical shaped left arm bulb configured on the left armrest free end of the left armrest;
      vi) a cup cylinder configured in at least one of the left arm bulb or right arm bulb and having an opening extending into said armrest bulb from a top surface of said left arm bulb or right arm bulb;
      vii) an end cup holder configured in at least one of the left arm bulb or right arm bulb and having an opening extending into said armrest bulb from the free end;
      viii) an inner perimeter extending along the closed end and along the left armrest and right armrest; and
   wherein the closed end extends in an arc from the right armrest to the left armrest.

2. The personal flotation system of claim 1, wherein both the left arm bulb and right arm bulb have a cup cylinder.

3. The personal flotation system of claim 1, wherein the personal float device consists essentially of a foam.

4. The personal flotation system of claim 1, further comprising:
   i) a right armrest groove extending down from a top surface of the right armrest and substantially orthogonal to an extension direction of the right armrest;
   ii) a left armrest groove extending down from a top surface of the left armrest and substantially orthogonal to an extension direction of the left armrest;
   wherein the right and left armrest grooves are aligned at a distance from the closed end.

5. The personal flotation system of claim 4, further comprising a pet pad detachably attached to the personal float device and configured under the personal float device along a bottom surface of the personal float device; wherein said bottom surface is planar; and wherein the pet pad comprises: a substantially planar buoyant structure; a left side slot; and right side slot, wherein a strap extends through said left and right side slots and around the left and right armrest to detachably attach the pet pad to the personal float device.

6. The personal flotation system of claim 5, wherein the left side slot and right side slot are configured inward the inner perimeter of the personal float device and aligned with the left armrest and right armrest respectively, and wherein the strap extends over the left armrest groove and the right armrest groove, and wherein the left and right armrest grooves retain the strap in position on the left and right armrest respectively.

7. The personal flotation system of claim 5, wherein the pet pad further comprises a third slot configured substantially orthogonal to said left side and right side slots and configured to receive a second strap therethrough said slot and around the closed end of the personal floatation device.

8. The personal flotation system of claim 7, further comprising an insulated storage case that is detachably attachable to the personal floatation device and wherein the insulated storage case comprises:
   a) a storage area;
   b) a lid over said storage area;
   c) an outer perimeter,
   wherein the outer perimeter is congruent to the inner perimeter of the personal float device; and
   whereby the insulated storage case fits snuggly within the inner perimeter of the personal float device.

9. The personal flotation system of claim 8, wherein the insulated storage case further comprises a handle slot configured to align with the third slot in the pet pad, and
   wherein said handle slot is configured to receive said second strap therethrough and through the third slot to detachably attach the insulated storage case to the pet pad and within the inner perimeter of the personal float device.

10. The personal flotation system of claim 9, further comprising a dry storage case comprising:
    a) a dry bag;
    b) a hook/loop fastener coupled to an outside surface of the dry bag;
    wherein the personal float comprises a hook/loop fastener coupled to an outside surface for attachment of the dry bag by said hook/loop fastener coupled to the dry bag.

11. The personal flotation system of claim 1, further comprising an insulated storage case that is detachably attachable to the personal floatation device and wherein the insulated storage case comprises:
    a) a storage area;
    b) a lid over said storage area;
    c) an outer perimeter;
    wherein the outer perimeter is congruent to the inner perimeter of the personal float device; and
    whereby the insulated storage case fits snuggly within the inner perimeter of the personal float device.

12. The personal flotation system of claim 11, wherein the insulated storage case further comprises a handle slot configured to align with the third slot in the pet pad, and
    wherein said handle slot is configured to receive said second strap therethrough and through the third slot to detachably attach the insulated storage case to the pet pad and within the inner perimeter of the personal float device.

13. The personal flotation system of claim 12, further comprising a dry storage case comprising:
    a) a dry bag;
    b) a hook/loop fastener coupled to an outside surface of the dry bag;
    wherein the personal float comprises a hook/loop fastener coupled to an outside surface for attachment of the dry bag by said hook/loop fastener coupled to the dry bag.

14. The personal flotation system of claim 1, further comprising a dry storage case comprising:
    a) a dry bag;
    b) a hook/loop fastener coupled to an outside surface of the dry bag;
    wherein the personal float comprises a hook/loop fastener coupled to an outside surface for attachment of the dry bag by said hook/loop fastener coupled to the dry bag.

15. A personal flotation system comprising:
    a) a personal float device comprising a buoyant structure comprising:
       i) closed end;

ii) a right armrest extending from a first side of the closed end to a right armrest free end;
iii) a cylindrical shaped left right arm bulb configured on the right armrest free end of the right armrest;
iv) a right armrest groove extending down from said top surface and substantially orthogonal to an extension direction of the right armrest;
v) a left armrest extending from a second side of the closed end to a left arm free end;
vi) a cylindrical shaped left left arm bulb configured on the left armrest free end of the left armrest;
vii) a left armrest groove extending down from said top surface of the left armrest and substantially orthogonal to an extension direction of the left armrest;
wherein the right and left armrest grooves are aligned at a distance from the closed end;
viii) a cup cylinder configured in at least one of the left arm bulb or right arm bulb and having a cavity extending into said armrest bulb from a top surface;
ix) an end cup cylinder configured in one of the left arm bulb or right arm bulb and having a cavity extending into said armrest bulb from the free end;
x) an inner perimeter extending along the closed end and along the left armrest and right armrest; and
wherein the closed end extends in an arc from the right armrest to the left armrest; and
wherein the personal float device consists essentially of a foam,
b) a pet pad detachably attached to the personal float device and configured under the personal float device along a bottom surface of the personal float device;
wherein said bottom surface is planar; and
wherein the pet pad comprises:
a substantially planar buoyant structure;
a left side slot; and
right side slot,
wherein a strap extends through said left and right side slots and around the left and right armrest to detachably attach the pet pad to the personal float device.

16. The personal flotation system of claim 15, wherein the left side slot and right side slot are configured inward the inner perimeter of the personal float device and aligned with the left armrest and right armrest respectively, and wherein the strap extends over the left armrest groove and the right armrest groove, and wherein the left and right armrest grooves retain the strap in position on the left and right armrest respectively.

17. The personal flotation system of claim 15, wherein the pet pad further comprises a third slot configured substantially orthogonal to said left side and right side slots and configured to receive a second strap therethrough said slot and around the closed end of the personal flotation device.

18. The personal flotation system of claim 15, further comprising an insulated storage case that is detachably attachable to the personal floatation device and wherein the insulated storage case comprises:
a) a storage area;
b) a lid over said storage area;
c) an outer perimeter;
wherein the outer perimeter is congruent to the inner perimeter of the personal float device; and
whereby the insulated storage case fits snuggly within the inner perimeter of the personal float device.

19. The personal flotation system of claim 18, wherein the insulated storage case further comprises a handle slot configured to align with the third slot in the pet pad, and
wherein said handle slot is configured to receive said second strap therethrough and through the third slot to detachably attach the insulated storage case to the pet pad and within the inner perimeter of the personal float device.

* * * * *